(12) United States Patent
Williams

(10) Patent No.: US 11,554,441 B2
(45) Date of Patent: Jan. 17, 2023

(54) SYSTEMS AND METHODS PROVIDING A TORCH THAT PRESENTS AS A GENUINE MANUFACTURER TORCH TO A POWER SOURCE

(71) Applicant: Lincoln Global, Inc., Santa Fe Springs, CA (US)

(72) Inventor: Christopher J. Williams, Norham (GB)

(73) Assignee: Lincoln Global, Inc., Santa Fe Springs, CA (US)

( * ) Notice: Subject to any disclaimer, the term of this patent is extended or adjusted under 35 U.S.C. 154(b) by 760 days.

(21) Appl. No.: 16/545,291

(22) Filed: Aug. 20, 2019

(65) Prior Publication Data
US 2021/0053140 A1    Feb. 25, 2021

(51) Int. Cl.
*B23K 10/00* (2006.01)
*B23K 37/00* (2006.01)

(52) U.S. Cl.
CPC .......... *B23K 10/006* (2013.01); *B23K 37/006* (2013.01)

(58) Field of Classification Search
CPC .. B23K 9/0956; B23K 10/006; B23K 37/006; G09B 19/24
USPC .................................................... 219/121.54
See application file for complete search history.

(56) References Cited

U.S. PATENT DOCUMENTS

| | | |
|---|---|---|
| 5,208,436 A | 5/1993 | Blankenship |
| 5,276,305 A | 1/1994 | Hsien |
| 7,096,077 B2 | 8/2006 | Price et al. |
| 8,445,816 B2 | 5/2013 | Cole |
| 8,536,480 B2 | 9/2013 | Miwa et al. |
| 8,785,816 B2 | 7/2014 | Kooken et al. |
| 9,114,483 B2 | 8/2015 | Enyedy |
| 9,609,734 B2 | 3/2017 | Stone |
| 9,751,150 B2 | 9/2017 | Daniel et al. |

(Continued)

FOREIGN PATENT DOCUMENTS

CN    105 184 930 A    12/2015

OTHER PUBLICATIONS

Extended European Search Report for Corresponding Application No. 20190721.9; dated Mar. 4, 2021; pp. 1-8.

(Continued)

*Primary Examiner* — Tu B Hoang
*Assistant Examiner* — Thomas J Ward
(74) *Attorney, Agent, or Firm* — David J. Muzilla

(57) ABSTRACT

Embodiments of welding and cutting systems are disclosed. A welding or cutting system includes a power source to provide electrical power for a welding or cutting process. The system includes a torch having a cryptographic device, and is to be used with the power source during the process and communicate with the power source. The cryptographic device is configured to receive an encryption key seeded by the power source during first time power-on initialization of the welding power source or after the torch is replaced. The cryptographic device is configured to store an unlock code associated with the power source, generate an encrypted message, which includes the unlock code, based on the encryption key, and communicate the encrypted message to the power source. The power source is configured to cease further operation unless the power source determines the torch to be a genuine manufacturer torch based on the unlock code.

21 Claims, 9 Drawing Sheets

(56) References Cited

U.S. PATENT DOCUMENTS

| | | | |
|---|---|---|---|
| 10,144,080 B2* | 12/2018 | Chantry | B23K 9/1056 |
| 10,245,672 B2 | 4/2019 | Kachline | |
| 2006/0086706 A1 | 4/2006 | Ulrich | |
| 2012/0099235 A1* | 4/2012 | Jezierski | H02H 5/04 |
| | | | 361/93.8 |
| 2014/0266591 A1 | 9/2014 | Klammer et al. | |
| 2015/0158109 A1 | 6/2015 | Chantry | |
| 2015/0277412 A1 | 10/2015 | Goeppert | |
| 2015/0283640 A1* | 10/2015 | Walker | B23K 10/006 |
| | | | 219/130.01 |
| 2015/0375327 A1* | 12/2015 | Becker | A61F 9/06 |
| | | | 219/130.01 |
| 2017/0046976 A1 | 2/2017 | Becker et al. | |

OTHER PUBLICATIONS

Efficient Manufacturing; "Exploring the role of Big Data in Welding Technology;" https://www.industr.com/en/exploring-the-role-of-big-data-in-welding-technology-2360956; Dated Feb. 15, 2019; pp. 1-8.
Matuschek; "Masdat Weld Gun Identification System;" https://www.matuschek.de/html/en/masdat.htm; Dated Oct. 15, 2013; p. 1.

* cited by examiner

SYSTEMS AND METHODS PROVIDING A TORCH THAT PRESENTS AS A GENUINE MANUFACTURER TORCH TO A POWER SOURCE

CROSS REFERENCE TO RELATED APPLICATION/INCORPORATION BY REFERENCE

The disclosure of U.S. Pat. No. 10,245,672, issued on Apr. 2, 2019, is incorporated herein by reference in its entirety, and is concerned with welding torch technology. The disclosure of U.S. Pat. No. 9,609,734, issued on Mar. 28, 2017, is incorporated herein by reference in its entirety, and is concerned with plasma cutting torch technology. The disclosure of U.S. Pat. No. 9,114,483, issued on Aug. 25, 2015, is incorporated herein by reference in its entirety, and is concerned with wire feeding technology. The disclosure of U.S. Pat. No. 9,751,150, issued on Sep. 5, 2017, is incorporated herein by reference in its entirety, and is concerned with power electronics technology in power sources. The disclosure of U.S. Pat. No. 8,785,816 entitled "Three Stage Power Source for Electric Arc Welding," issued on Jul. 22, 2014, is incorporated herein by reference in its entirety, and is concerned with power and control electronics.

FIELD

Embodiments of the present invention relate to welding and cutting systems, and more specifically to systems and methods providing a welding or cutting torch that presents as a genuine manufacturer torch to a welding or cutting power source.

BACKGROUND

Competitors of a genuine manufacturer of plasma cutting and welding torches can copy those torches and thereby limit the ability of the genuine manufacturer to sell consumables. Mechanical solutions have been developed that tie the consumables to the torch. However, this does not prevent a competitor from replacing the torch, resulting in reduced consumable revenue for the genuine manufacturer.

SUMMARY

Embodiments of the present invention include systems and methods related to electronically locking a welding or cutting torch to a corresponding welding or cutting power source by providing security features. One embodiment includes a welding system. The welding system includes a welding power source configured to provide electrical power for a welding process. The welding system also includes a welding torch having a cryptographic device. The welding torch is configured to be used with the welding power source during the welding process and communicate with the welding power source. The cryptographic device is configured to receive an encryption key seeded by the welding power source during first time power-on initialization of the welding power source with the welding torch, or after the welding torch is replaced on the welding power source. The cryptographic device is also configured to store an unlock code associated with the welding power source and generate an encrypted message, which includes the unlock code, based on the encryption key as seeded. The cryptographic device is further configured to communicate the encrypted message to the welding power source. The welding power source is configured to cease further operation unless the welding power source determines the welding torch to be a genuine manufacturer welding torch based on the unlock code. In one embodiment, the cryptographic device is configured to periodically generate and communicate updated encryption messages to the welding power source to guarantee a continuing presence of the welding torch as a genuine manufacturer welding torch. In one embodiment, a polynomial spline is applied to the unlock code to change the unlock code as part of generating the updated encryption messages. Circuitry (e.g., silicon gates) of the cryptographic device is fuse protected such that all codes are locked and cannot be read, thus eliminating the possibility of hardware duplication. In one embodiment, communication between the welding torch and the welding power source is via wired means (wired communication). In another embodiment, communication between the welding torch and the welding power source is via wireless means (wireless communication). In one embodiment, the welding torch includes a body within which the cryptographic device resides. In another embodiment, the cryptographic device is attached externally to the body of the welding torch. In one embodiment, the welding torch includes a lead or cable within which the cryptographic device resides. In another embodiment, the cryptographic device is attached externally to the lead or cable of the welding torch. In one embodiment, the cryptographic device includes a printed circuit board (PCB) with electronic components mounted thereon. In one embodiment, the welding power source includes a wire feeding device, power electronics, and control electronics. In one embodiment, the encrypted message also includes a part number of the welding torch and/or a serial number of the welding torch.

In one embodiment, a cutting system is provided (e.g., a plasma cutting system). The cutting system includes a cutting power source configured to provide electrical power for a cutting process. The cutting system also includes a cutting torch having a cryptographic device. The cutting torch is configured to be used with the cutting power source during the cutting process and communicate with the cutting power source. The cryptographic device is configured to receive an encryption key seeded by the cutting power source during first time power-on initialization of the cutting power source with the cutting torch, or after the cutting torch is replaced on the cutting power source. The cryptographic device is also configured to store an unlock code associated with the cutting power source and generate an encrypted message, which includes the unlock code, based on the encryption key as seeded. The cryptographic device is further configured to communicate the encrypted message to the cutting power source. The cutting power source is configured to cease further operation unless the cutting power source determines the cutting torch to be a genuine manufacturer cutting torch based on the unlock code. In one embodiment, the cryptographic device is configured to periodically generate and communicate updated encryption messages to the cutting power source to guarantee a continuing presence of the cutting torch as a genuine manufacturer cutting torch. In one embodiment, a polynomial spline is applied to the unlock code to change the unlock code as part of generating the updated encryption messages. Circuitry (e.g., silicon gates) of the cryptographic device is fuse protected such that all codes are locked and cannot be read, thus eliminating the possibility of hardware duplication. In one embodiment, communication between the cutting torch and the cutting power source is via wired means (wired communication). In another embodiment, communication between the cutting torch and the cutting power source is via wireless means (wireless communication). In one embodiment, the cutting torch includes a body within which the cryptographic device resides. In another embodiment, the cryptographic device is attached externally to the body of the cutting torch. In one embodiment, the cutting torch includes a lead or cable within which the cryptographic device resides. In another embodiment, the cryptographic device is attached externally to the lead or cable of the cutting torch. In one embodiment, the cryptographic device includes a printed circuit board (PCB) with electronic components mounted thereon. In one embodiment, the cutting power source includes power electronics and control electronics. In one embodiment, the encrypted message also includes a part number of the cutting torch and/or a serial number of the cutting torch.

Numerous aspects of the general inventive concepts will become readily apparent from the following detailed description of exemplary embodiments and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments of the present invention are concerned with presenting a part (e.g., a welding or cutting torch) to a power source (e.g., a corresponding welding or cutting power source) as a genuine manufacturer part. The power source will not operate unless the part is a genuine manufacturer part. For example, a genuine manufacturer part (e.g., a welding or cutting torch) is fitted with a cryptographic device that communicates with a power source. As described herein, cryptographic techniques are used, in conjunction with an unlock code, to effectively unlock the power source to be used with the genuine manufacturer part. If the part is not a genuine manufacturer part, the power source will not unlock and operate. The power source will unlock and operate when the part has been determined (as described herein) to be a genuine manufacturer part. As used herein, the term "genuine manufacturer" is a manufacturer that is authorized to manufacture a part to be used with a power source. For example, a genuine manufacturer part is a part (e.g., a torch) that was manufactured by the same manufacturer that manufactured the power source, or a manufacturer that was authorized to manufacture the part by the manufacturer of the power source. A genuine manufacturer part is not a part that was manufactured by some unauthorized third party (e.g., a competitor of the genuine manufacturer).

Figure 1:
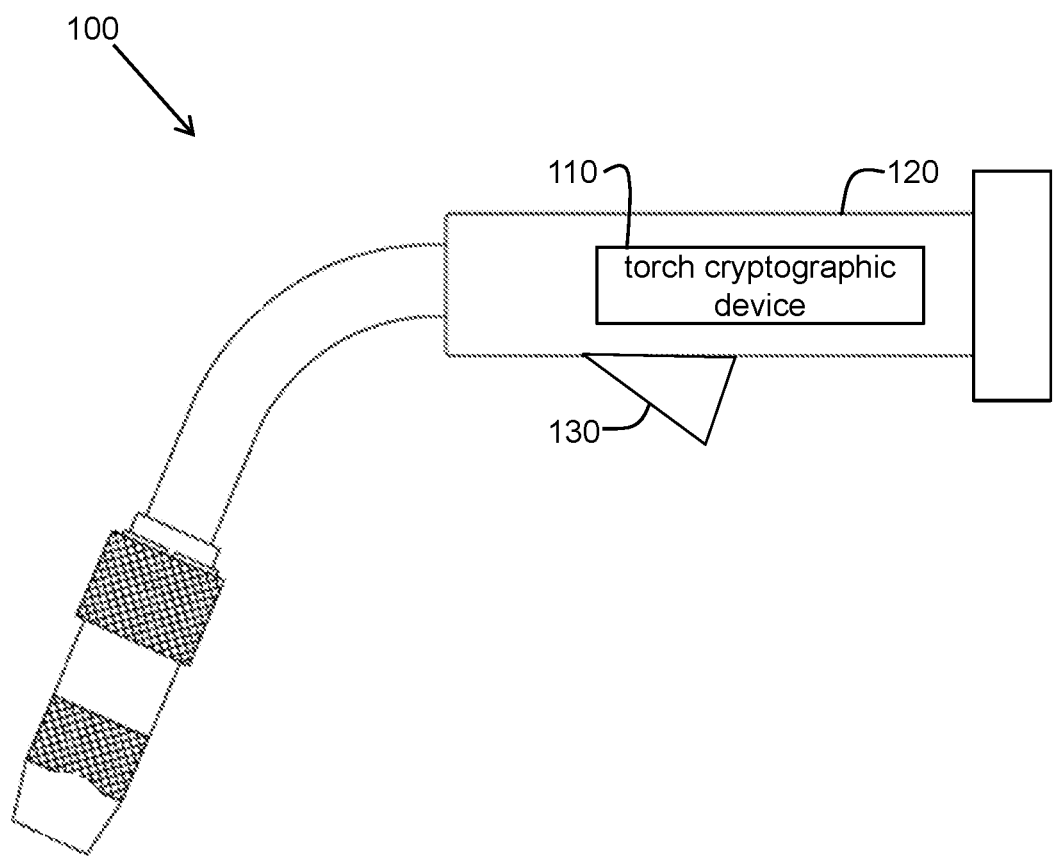
FIG. 1 schematically illustrates a first embodiment of a welding or cutting torch having a cryptographic device (a torch cryptographic device) within or on a body of the torch.

The examples and figures herein are illustrative only and are not meant to limit the subject invention, which is measured by the scope and spirit of the claims. FIG. 1 schematically illustrates a first embodiment of a welding or cutting torch 100 having a cryptographic device (a torch cryptographic device 110) within or on (attached to) a body 120 of the torch 100. The body 120 of the torch 100 may serve as a handle and has an activation trigger 130 associated therewith. The torch 100 may be a welding torch as used in arc welding, or a cutting torch as used in plasma cutting. Welding torch technology and cutting torch technology are well known in the art. For example, the disclosure of U.S. Pat. No. 10,245,672, issued on Apr. 2, 2019, is incorporated herein by reference in its entirety, and is concerned with welding torch technology. The disclosure of U.S. Pat. No. 9,609,734, issued on Mar. 28, 2017, is incorporated herein by reference in its entirety, and is concerned with plasma cutting torch technology.

Figure 2:
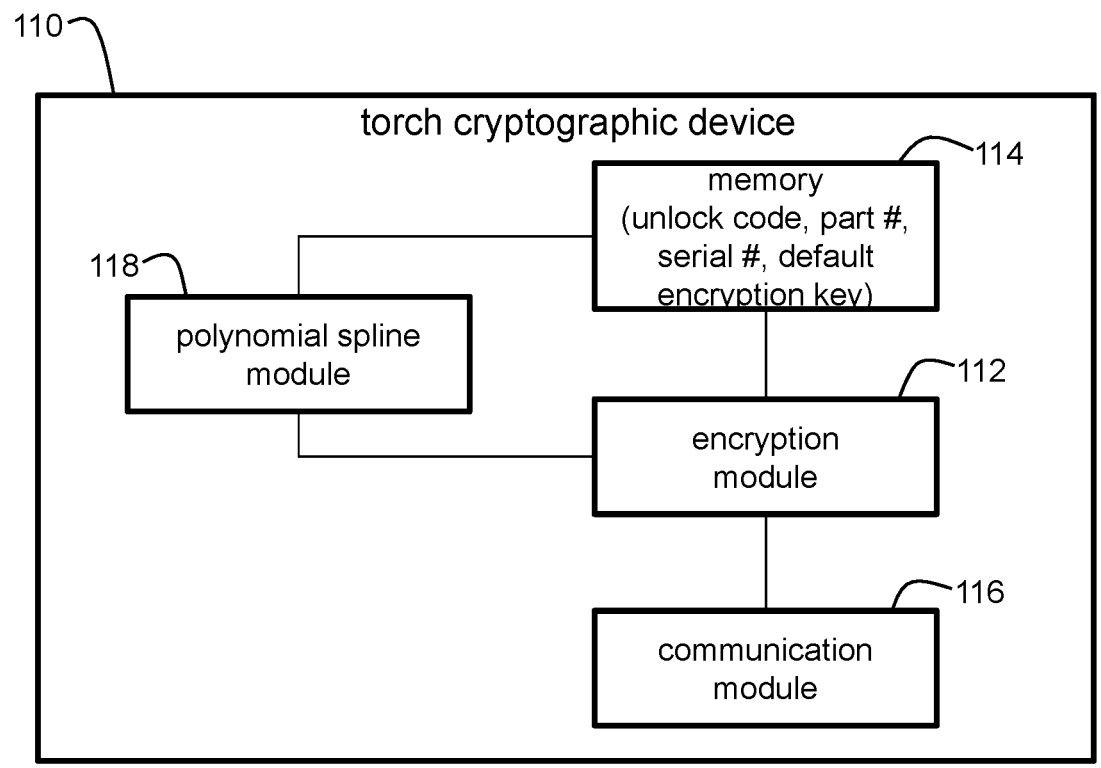
FIG. 2 illustrates a schematic block diagram of one embodiment of the torch cryptographic device of FIG. 1.

FIG. 2 illustrates a schematic block diagram of one embodiment of the torch cryptographic device 110 (a type of security electronics) of FIG. 1. The torch cryptographic device 110 includes an encryption module (component) 112, a memory 114, a communication module (component) 116, and a polynomial spline module (component) 118. The encryption module 112 is configured to generate an encrypted message (cipher text) using an encryption key provided by a power source (e.g., a welding or cutting power source). The encryption module 112 may include various types of circuitry including, for example, at least one of a microprocessor, an application specific integrated circuit (ASIC), a field programmable gate array (FPGA), a digital signal processor, a programmable logic device (PLD), and memory. The encryption module 112 implements an encryption algorithm of a type, for example, which is known in the art. In accordance with one embodiment, at least some of the circuitry of the encryption module 112 is fuse protected to prevent the hardware from being copied by third parties.

The memory 114 is configured to store an unlock code which is associated with a power source (e.g., a welding power source or a cutting power source). The unlock code is accessible by the encryption module 112 and is incorporated into the encrypted message by the encryption module 112 as part of generating the encrypted message. The memory 114 can include circuitry for a number of different types and forms of memory including random access memory (RAM), read only memory (ROM), and a register. Other types of memory circuitry may be possible as well, in accordance with other embodiments. In accordance with one embodiment, at least some of the circuitry of the memory 114 is fuse protected to prevent the hardware from being copied by third parties. In one embodiment, the memory 114 is an element of the encryption module 112. In accordance with other embodiments, the memory 114 may store the unlock code as well as, for example, a part number (part #) of the torch 100 and/or a serial number (serial #) of the torch 100. Furthermore, the memory 114 may store the encryption key provided by a power source (e.g., a welding or cutting power source).

The communication module (component) 116 is configured to communicate directly (or indirectly) with a power source (e.g., a welding or cutting power source). In one embodiment, the communication module 116 communicates with a wire feeding device (which is external to the power source) which communicates with a power source (i.e., indirect communication). In general, the communication module 116 is configured to receive the encryption key from the power source and transmit the encrypted message to the power source, in accordance with one embodiment. The communication module 116 may communicate in a wired manner, in accordance with one embodiment, or in a wireless manner, in accordance with another embodiment. In one embodiment, the communication module 116 supports digital communications. However, in another embodiment, the communication module 116 supports analog communications. The communication module 116 may include various types of digital and/or analog circuitry/technology, which are known in the art, for communicating between two devices (e.g., BLUETOOTH® technology, WiFi (IEEE 802.11) technology, Zigbee technology, copper wire technologies, fiber optic technologies).

The polynomial spline module (component) 118 is configured to access the unlock code from the memory 114, apply a polynomial spline to the unlock code to modify (change) the unlock code, and provide the modified unlock code to the encryption module 112 for incorporation into the encrypted message. A polynomial spline is a mathematical function defined in a piecewise manner by polynomials. In one embodiment, the torch cryptography device 110 periodically transmits an updated encrypted message to the power source, with a modified unlock code, to guarantee the torch 100 as being present at all times and eliminating the possibility of working around the locking strategy through hot swapping of the torches. The polynomial spline module 118 allows the unlock code to be periodically or continuously changed for a next encrypted message to prevent replication or emulation of data by an unauthorized third party device. The power source uses the same polynomials and therefore, after receiving and decrypting an encrypted message, can extract the unlock code to validate the torch 100 as being a genuine manufacturer torch. The polynomial spline module 118 may include various types of circuitry including, for example, at least one of a microprocessor, an application specific integrated circuit (ASIC), a field programmable gate array (FPGA), a digital signal processor, a programmable logic device (PLD), and memory. In accordance with one embodiment, at least some of the circuitry of the polynomial spline module 118 is fuse protected to prevent the hardware from being copied by third parties. In one embodiment, the polynomial spline module 118 is an element of the encryption module 112.

Figure 3:
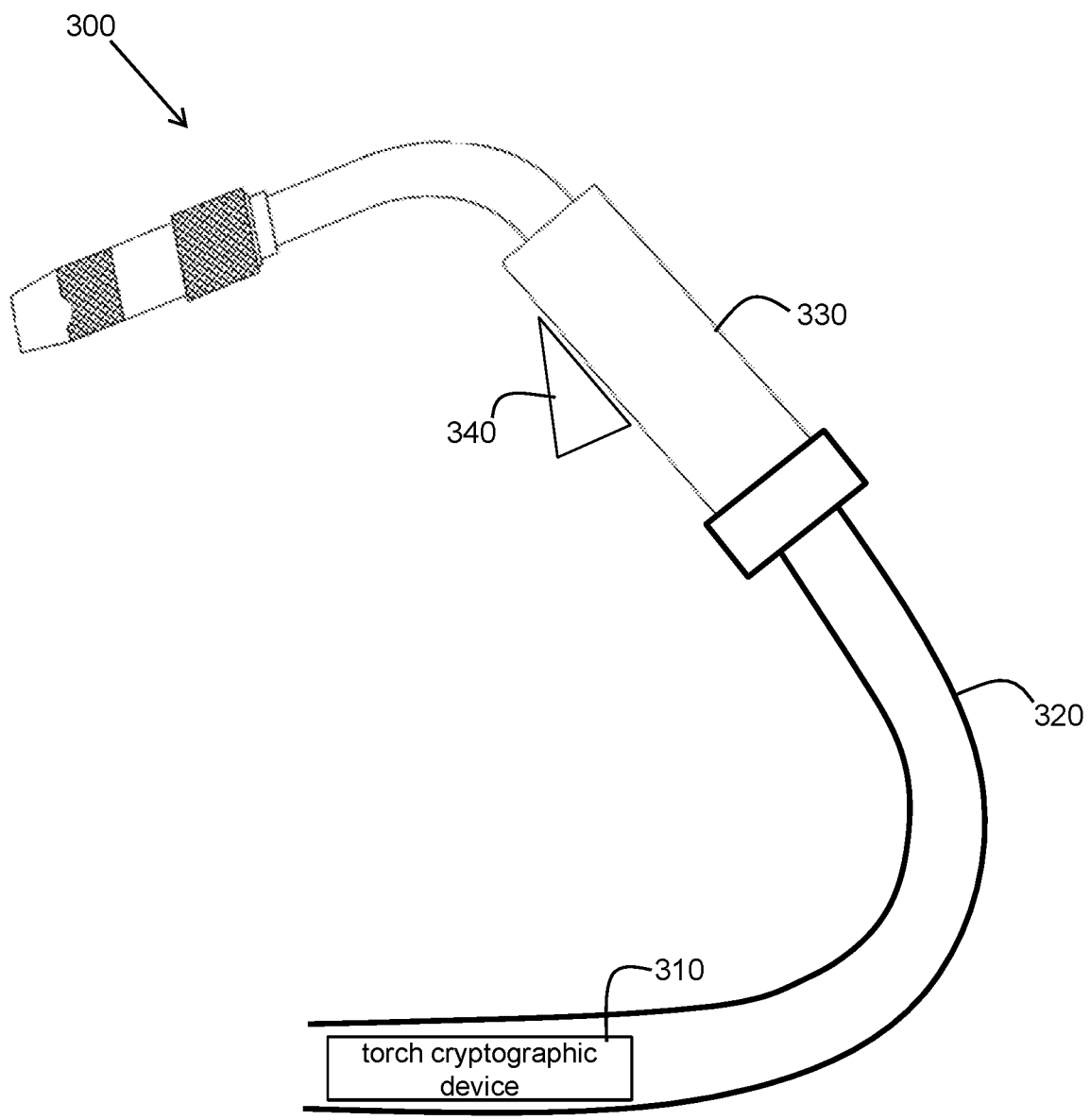
FIG. 3 schematically illustrates a second embodiment of a welding or cutting torch having a cryptographic device (a torch cryptographic device) within or on a torch lead or cable.

FIG. 3 schematically illustrates a second embodiment of a welding or cutting torch 300 having a cryptographic device (a torch cryptographic device 310) within or on (attached to) a torch lead or cable 320. Similar to the torch 100 of FIG. 1, the torch 300 also includes a body 330 and an activation trigger 340. The torch cryptographic device 310 (a type of security electronics) of FIG. 3 is functionally the same as the torch cryptographic device 110 of FIG. 1 and FIG. 2 but, instead of being located within or on (attached to) the body 330, is located within or on (attached to) the torch lead or cable 320. The torch lead or cable 320 is configured to connect directly (or indirectly) to a power source. For example, in one embodiment, the torch lead or cable 320 connects to a wire feeding device (external to the power source) which connects to the power source (i.e., an indirect connection). In other embodiments, the torch cryptographic device 110 may be located elsewhere such as, for example, on (attached to) the neck of the torch.

Figure 4:
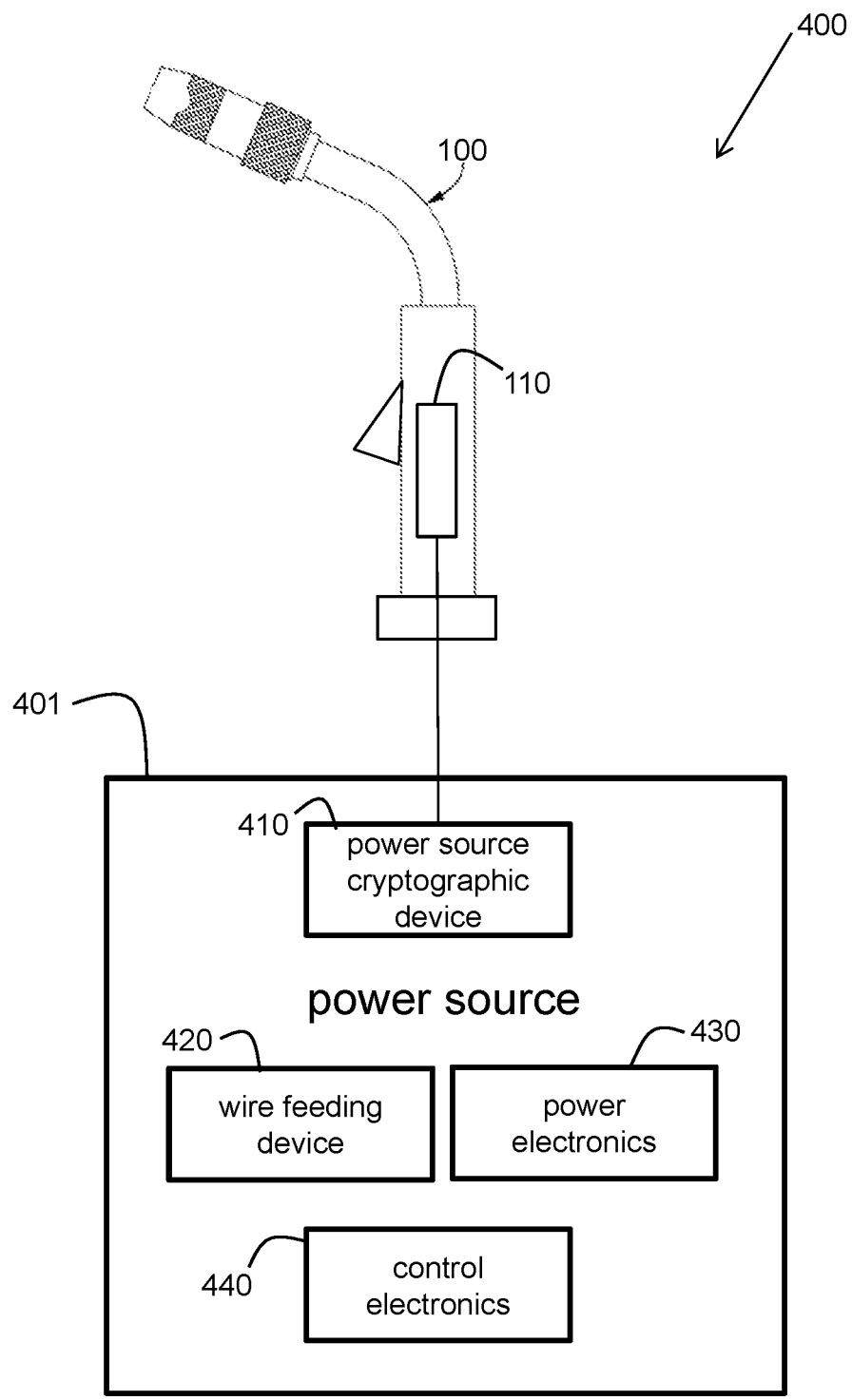
FIG. 4 illustrates a schematic block diagram of one embodiment of a welding or cutting system having the welding or cutting torch of FIG. 1 communicatively interfacing to a corresponding welding or cutting power source having a cryptographic device (a power source cryptographic device)

FIG. 4 illustrates a schematic block diagram of one embodiment of a welding or cutting system 400 having the welding or cutting torch 100 of FIG. 1 communicatively interfacing to a corresponding welding or cutting power source 401 having a cryptographic device (a power source cryptographic device 410). In one embodiment, where the power source 401 is a welding power source, the power source includes a wire feeding device 420, power electronics 430, and control electronics (a controller) 440. In another embodiment, where the power source 401 is a cutting power source, the power source includes the power electronics 430 and the control electronics (a controller) 440, but not the wire feeding device 420. The control electronics 440 is configured to control the power source cryptographic device 410, the wire feeding device 420, and the power electronics 430, in accordance with one embodiment, where the power source 401 is a semi-automatic welding power source. The control electronics 440 is configured to control the power source cryptographic device 410 and the power electronics 430, in accordance with another embodiment, where the power source 401 is a plasma cutting power source.

Wire feeding devices are well known to those of ordinary skill in the art and need not be described in detail herein. However, as an example, the disclosure of U.S. Pat. No. 9,114,483, issued on Aug. 25, 2015, is incorporated herein by reference in its entirety, and is concerned with wire feeding technology. Power electronics are well known to those of ordinary skill in the art and need not be described in detail herein. However, as an example, the disclosure of U.S. Pat. No. 9,751,150, issued on Sep. 5, 2017, is incorporated herein by reference in its entirety, and is concerned with power electronics technology in power sources. Control electronics or controllers are well known to those or ordinary skill in the art and need not be described in detail herein. However, as an example, FIG. 8 herein illustrates one embodiment of example control electronics 800. Furthermore, the construction and operation of such control electronics (e.g., 440) and power electronics (e.g., 430) are known to those of ordinary skill in the art, and need not be described in detail herein. However, a representative example of the construction of a welding power source contemplated by some embodiments of the present invention, including a discussion of the power and control electronics can be found in U.S. Pat. No. 8,785,816 entitled "Three Stage Power Source for Electric Arc Welding," issued on Jul. 22, 2014, the disclosure of which is incorporated herein by reference in its entirety.

Figure 5:
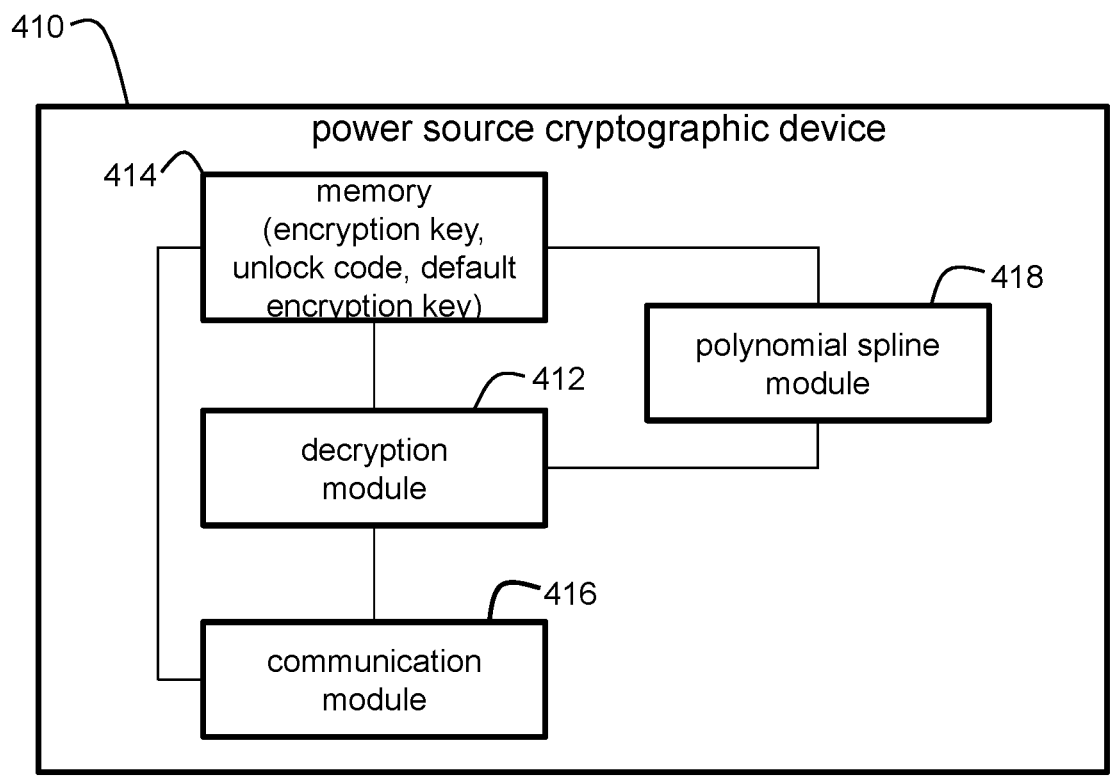
FIG. 5 illustrates a schematic block diagram of one embodiment of the power source cryptographic device of FIG. 4.

FIG. 5 illustrates a schematic block diagram of one embodiment of the power source cryptographic device 410 of FIG. 4. The power source cryptographic device 410 includes a decryption module (component) 412, a memory 414, a communication module (component) 416, and a polynomial spline module (component) 418. The decryption module 412 is configured to decrypt an encrypted message (cipher text) received from the torch (e.g., 100 or 300) using the encryption key previously provided by the power source 401 to the torch. The decryption module 412 may include various types of circuitry including, for example, at least one of a microprocessor, an application specific integrated circuit (ASIC), a field programmable gate array (FPGA), a digital signal processor, a programmable logic device (PLD), and memory. The decryption module 412 implements a decryption algorithm of a type, for example, which is known in the art and corresponds to the encryption algorithm used by the torch cryptographic device 110. In accordance with one embodiment, at least some of the circuitry of the decryption module 412 is fuse protected to prevent the hardware from being copied by third parties.

The memory 414 is configured to store the encryption key (i.e., the primary encryption key) which gets sent to the torch (e.g., 100 or 300). The encryption key in the memory 414 is accessible by the decryption module 412 and is used to decrypt an encrypted message from the torch. The memory 414 can include circuitry for a number of different types and forms of memory including random access memory (RAM), read only memory (ROM), and a register. Other types of memory circuitry may be possible as well, in accordance with other embodiments. In accordance with one embodiment, at least some of the circuitry of the memory 414 is fuse protected to prevent the hardware from being copied by third parties. In one embodiment, the memory 414 is an element of the encryption module 412. In accordance with other embodiments, the memory 414 may store the encryption key as well as, for example, the unlock code, and a default encryption key.

The default encryption key is different from the primary encryption key and is used for fatal error recovery and torch replacement. For example, in one embodiment, if a new torch is detected as being connected to the power source (e.g., a replacement torch after just using a previous torch), the new torch will have a default encryption key that will enable it to expose itself as a genuine manufacturer torch to the power source. Subsequently, an initialization sequence will ensue that seeds the new torch with the primary encryption key from the power source before entering a quiescent state of communication between the power source and the new torch. If a fatal error occurs, causing an irrecoverable state with communication between the torch and the power source, then the torch will revert to the default encryption key, similarly enabling the power source to discover and re-seed the primary encryption key.

The communication module (component) 416 is configured to communicate directly (or indirectly) with a torch (e.g., a welding or cutting torch). In one embodiment, the communication module 416 communicates with a wire feeding device (which is external to the power source) which communicates with a torch (i.e., indirect communication). In general, the communication module 416 is configured to transmit an encryption key from the power source to the torch, and receive an encrypted message from the torch. The communication module 416 may communicate in a wired manner, in accordance with one embodiment, or in a wireless manner, in accordance with another embodiment. In one embodiment, the communication module 416 supports digital communications. However, in another embodiment, the communication module 416 supports analog communications. The communication module 416 may include various types of digital and/or analog circuitry/technology, which are known in the art, for communicating between two devices (e.g., BLUETOOTH® technology, WiFi (IEEE 802.11) technology, Zigbee technology, copper wire technologies, fiber optic technologies).

The polynomial spline module (component) 418 is configured to access the modified unlock code (from the encrypted message that has been decrypted by the decryption module 412) and apply a polynomial spline (in a reverse manner to that of the torch) to the modified unlock code to recover the unlock code. The unlock code is then used to determine whether or not the torch is a genuine manufacturer torch. For example, if the unlock code derived from the encrypted message matches the unlock code stored in the memory 414, then the torch is deemed to be a genuine manufacturer torch. In one embodiment, the decryption module 412 compares the unlock code derived from the encryption message to the unlock code stored in the memory 414. In another embodiment, the control electronics 440 compares the unlock code derived from the encryption message to the unlock code stored in the memory 414. Other embodiments of comparison are possible as well.

Again, a polynomial spline is a mathematical function defined in a piecewise manner by polynomials. In one embodiment, the torch cryptography device 110 periodically transmits an updated encrypted message to the power source 401, with a modified unlock code, to guarantee the torch 100 as being present at all times and eliminating the possibility of working around the locking strategy through hot swapping of the torches. The polynomial spline module 118 allows the unlock code to be periodically or continuously changed for a next encrypted message to prevent replication or emulation of data by a third party device. The polynomial spline module 418 of the power source 401 uses the same polynomials as the torch and therefore, after receiving and decrypting an encrypted message, can extract the unlock code to validate the torch as being a genuine manufacturer torch. The polynomial spline module 418 may include various types of circuitry including, for example, at least one of a microprocessor, an application specific integrated circuit (ASIC), a field programmable gate array (FPGA), a digital signal processor, a programmable logic device (PLD), and memory. In accordance with one embodiment, at least some of the circuitry of the polynomial spline module 418 is fuse protected to prevent the hardware from being copied by third parties. In one embodiment, the polynomial spline module 418 is an element of the decryption module 412.

Figure 6:
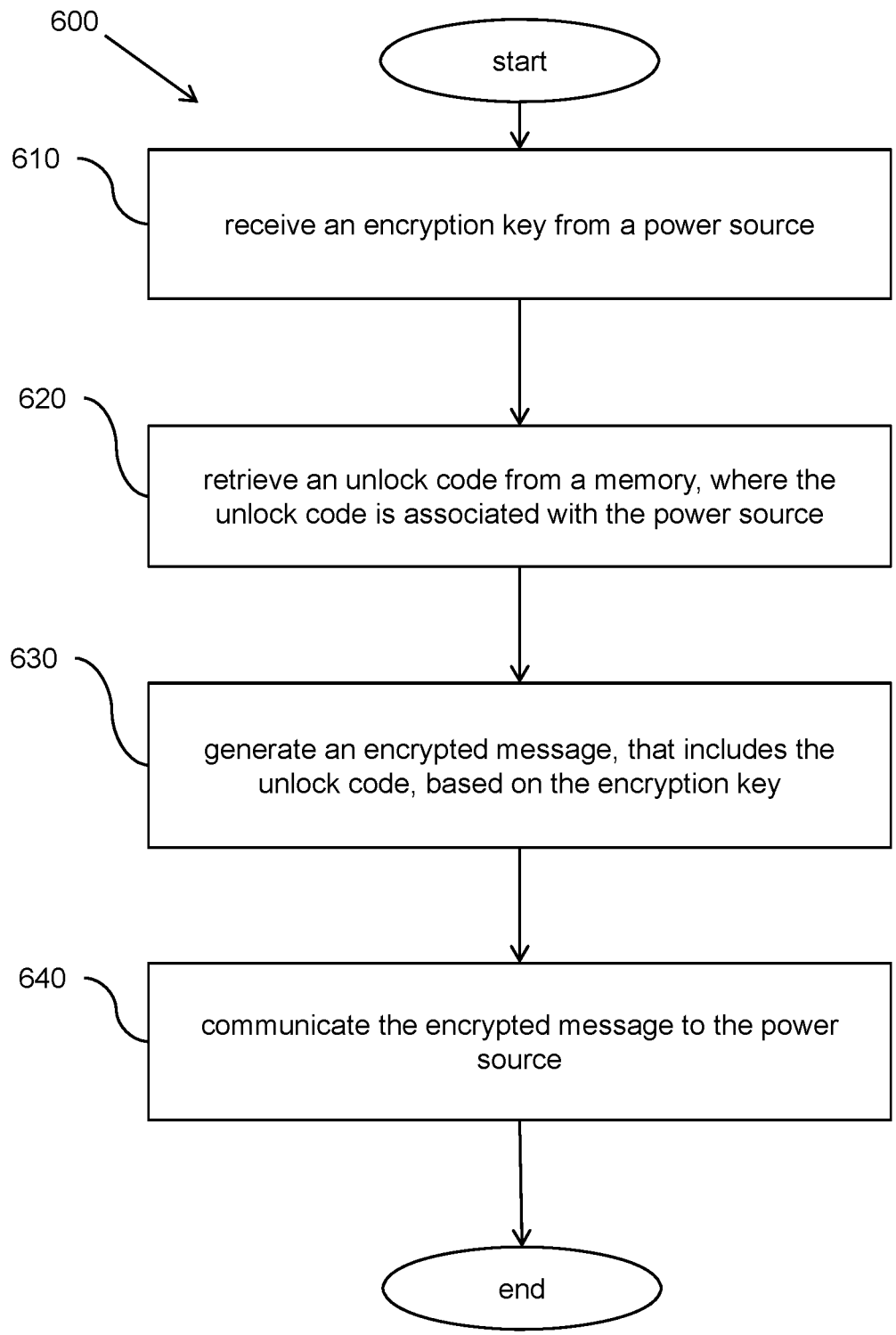
FIG. 6 illustrates a flow chart of one embodiment of a method performed by the torch cryptographic device of FIG. 1, FIG. 2, or FIG. 3.

FIG. 6 illustrates a flow chart of one embodiment of a method 600 performed by the torch cryptographic device (110 or 310) of FIG. 1, FIG. 2, or FIG. 3. At block 610, the torch cryptographic device of the torch receives an encryption key from a power source. This occurs, for example, when the torch is first connected to the power source. At block 620, the torch cryptographic device retrieves an unlock code from a memory (e.g., from a memory of the torch cryptographic device), where the unlock code is associated with the power source. The unlock code is stored in the torch and is associated with the power source at the factory by the genuine manufacturer. At block 630, the torch cryptographic device generates an encrypted message, that includes the unlock code, based on the encryption key. At block 640, the torch cryptographic device communicates the encrypted message to the power source. In one embodiment, communication between the power source and the torch is performed digitally. However, analog methods of communication may be possible as well. In one embodiment, communication between the power source and the torch is performed wirelessly. However, wired methods of communication are possible as well.

Figure 7:
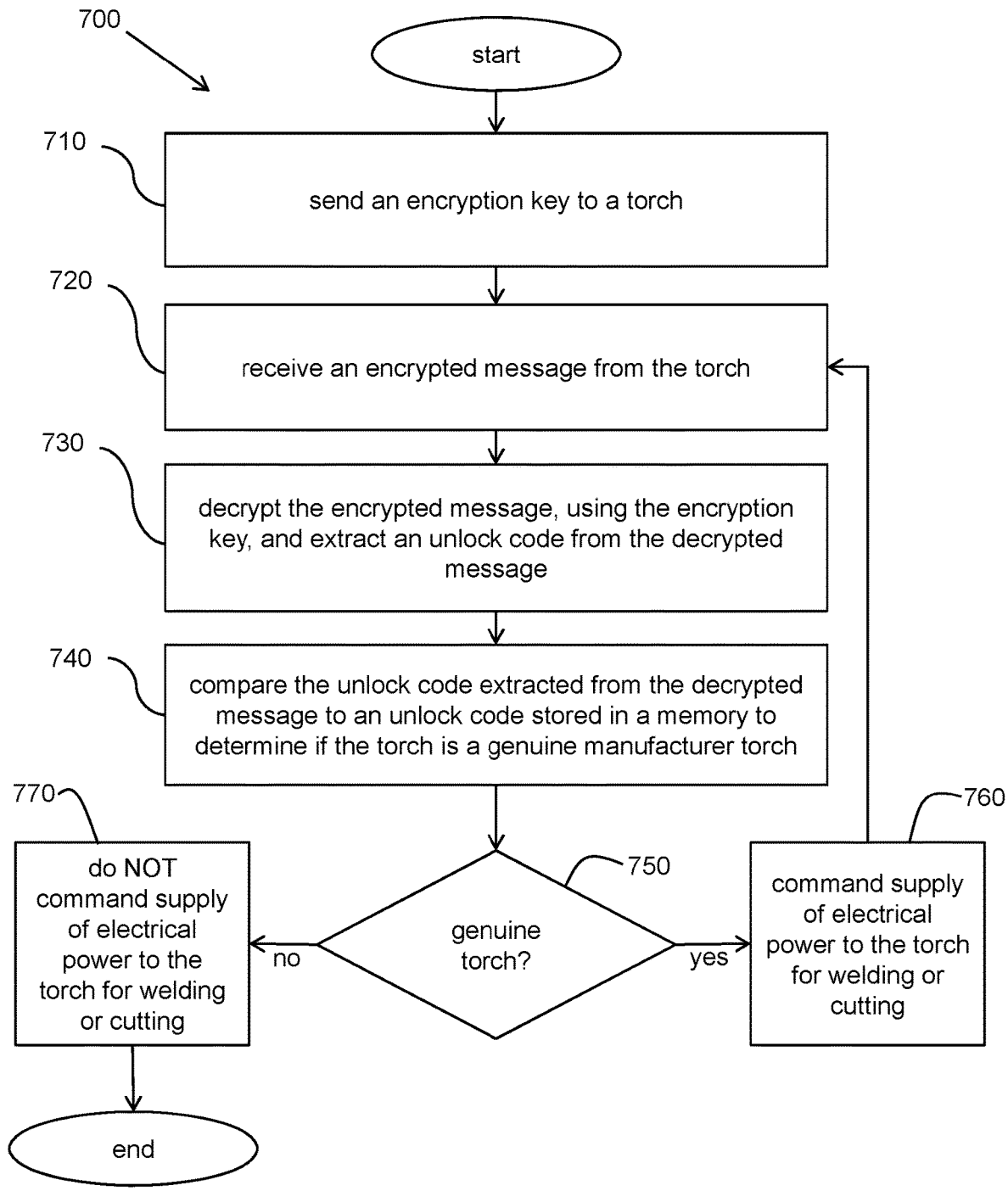
FIG. 7 illustrates a flow chart of one embodiment of a method performed by the power source cryptographic device of FIG. 4 or FIG. 5.

FIG. 7 illustrates a flow chart of one embodiment of a method 700 performed by the power source cryptographic device 410 of FIG. 4 or FIG. 5. At block 710, the power source cryptographic device sends (transmits) an encryption key to a torch to seed the torch. This occurs, for example, when the torch is first connected to the power source. At block 720, the power source cryptographic device receives an encrypted message from the torch. The encrypted message was encrypted by the torch using the encryption key sent by the power source cryptographic device. In one embodiment, communication between the power source and the torch is performed digitally. However, analog methods of communication may be possible as well. In one embodiment, communication between the power source and the torch is performed wirelessly. However, wired methods of communication are possible as well. The encrypted message includes an unlock code that is associated with the power source. The unlock code is stored in the torch and is associated with the power source at the factory by the genuine manufacturer. At block 730, the power source cryptographic device decrypts the encrypted message, using the encryption key, and extracts the unlock code from the decrypted message. At block 740, the power source cryptographic device compares the unlock code extracted from the decrypted message to an unlock code stored in a memory (e.g., a memory of the power source cryptographic device) to determine if the torch is a genuine manufacturer torch. At block 750, if the compared codes match, then the torch is flagged as being a genuine manufacturer torch and, at block 760, the power source is commanded to continue operation and supply electrical power to the torch. Otherwise, at block 770, the power source is commanded to cease further operation and not supply electrical power to the torch. In one embodiment, a polynomial spline is first applied to the unlock code before comparison, as discussed previously herein. In one embodiment, the comparison of the unlock codes may be performed by control electronics (a controller) of the power source, instead of by the power source cryptographic device.

Figure 8:
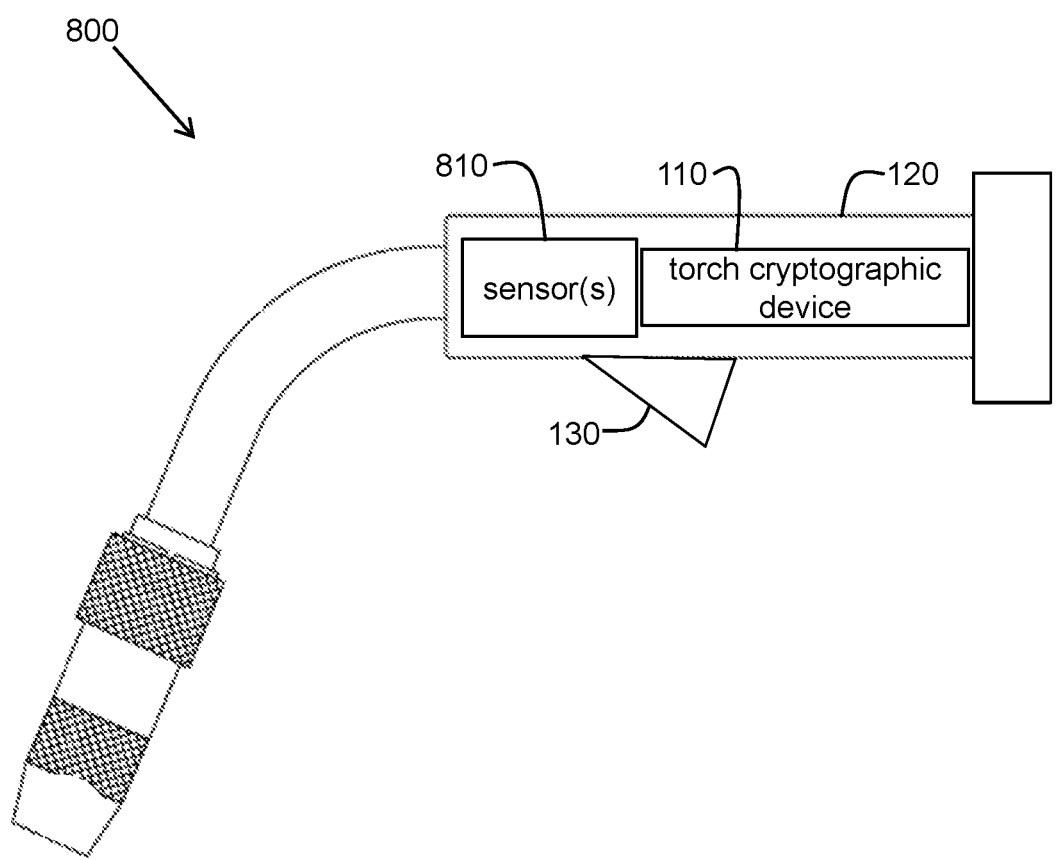
FIG. 8 schematically illustrates a third embodiment of a welding or cutting torch having a cryptographic device (a torch cryptographic device) and a sensor within or on a body of the torch.

Additional security features may be incorporated into a system intended to be used with a genuine manufacturer torch. For example, in accordance with one embodiment, a genuine manufacturer torch includes at least one sensor such as, for example, at least one of a motion sensor (e.g., an accelerometer), a position sensor (e.g., a gyroscope), and a temperature sensor (e.g., a thermometer). FIG. 8 schematically illustrates a third embodiment of a welding or cutting torch 800 having a cryptographic device 110, similar to the torch 100 of FIG. 1, but also having at least one sensor 810 within or on a body 120 of the torch 800. The sensor(s) 810 report(s) motion, position, and/or temperature of the torch to the controller of the power source. In this manner, the power source is able to constantly monitor the motion, position, and/or temperature of the genuine manufacturer torch 800 during use. If someone wanted to get around the security features of a genuine manufacturer torch described previously herein, they may attempt to connect the leads of the genuine manufacturer torch to a non-genuine manufacturer torch. The genuine manufacturer torch (and its security electronics) could be left dangling while a user used the non-genuine manufacturer torch during a welding or cutting process. However, with the sensor(s) 810 in the genuine manufacturer torch 800 reporting to the power source, the power source would be able to determine lack of use (lack of motion, lack of change in position, and/or lack of heating) of the genuine manufacturer torch 800 and lock out the torches, including the non-genuine manufacturer torch, thus stopping the attempt to get around the security features.

The genuine manufacturer part has been discussed herein with respect to being a welding torch or a plasma cutting torch. However, other types of parts may be genuine manufacturer parts that are configured to present to a power source (e.g., a welding or cutting power source) as a genuine manufacturer part as described herein, in accordance with other embodiments. For example, such other types of genuine manufacturer parts may include auxiliary tools (e.g., a grinder, lights, a drill, a saw, and a cutter).

Similarly, the genuine manufacturer part has been discussed herein with respect to presenting to a power source as a genuine manufacturer part. However, other embodiments may include a genuine manufacturer part presenting to an apparatus other than a power source. For example, a genuine manufacturer part may present to a gas controller of a welding or cutting system. As another example, a genuine manufacturer part may present to a human-machine interface (HMI) of a welding or cutting system. In this manner, the genuine manufacturer part may have to present to each apparatus connected to the genuine manufacture part, as described herein, to allow each apparatus to become fully operational.

Figure 9:
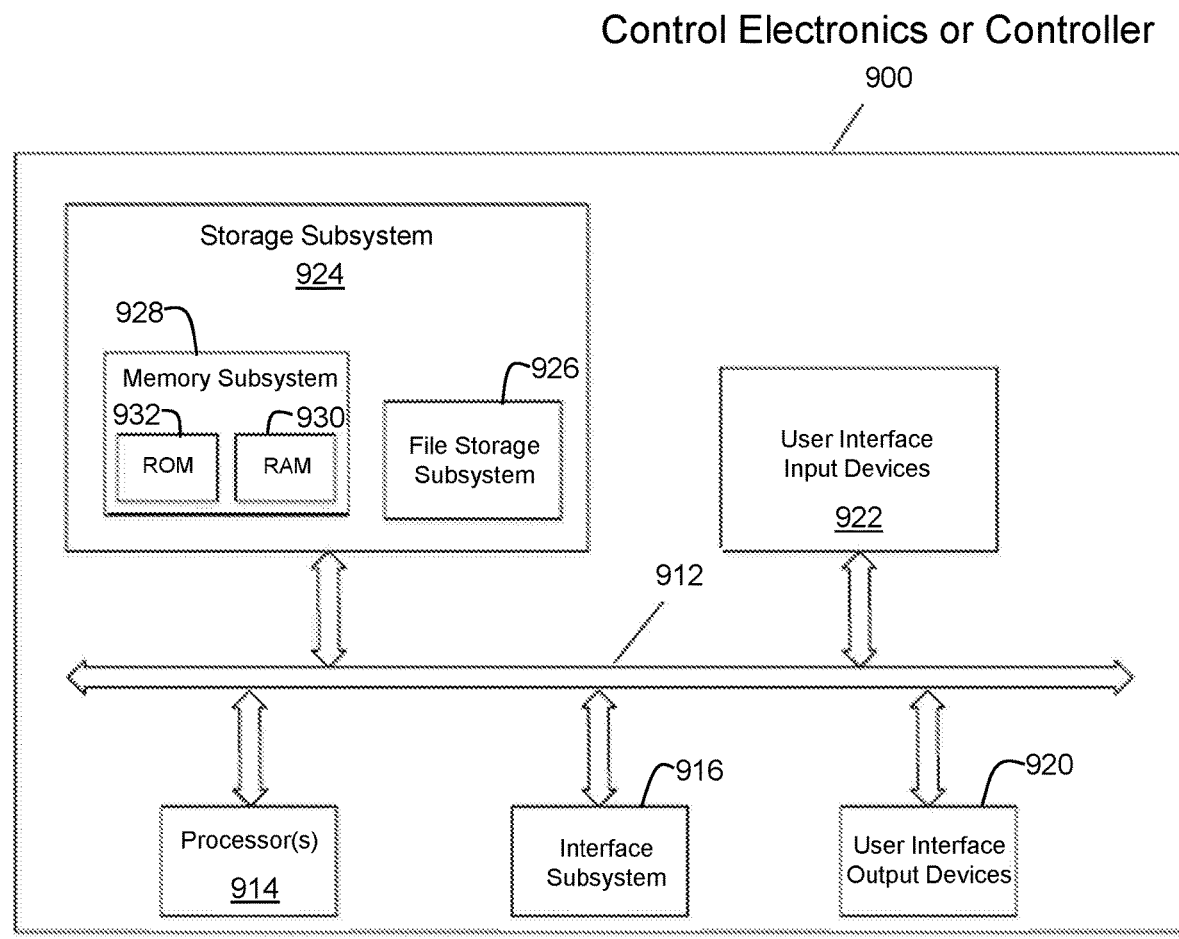
FIG. 9 illustrates one embodiment of example control electronics used in the welding or cutting power source of FIG. 4.

FIG. 9 illustrates one embodiment of example control electronics 900 (e.g., the control electronics 440 used in the welding or cutting power source of FIG. 4). For example, the control electronics 440 in the power source 401 of FIG. 4 may help to control the functioning of the cryptographic device 410, the wire feeding device 420, and the power electronics 430. The control electronics 900 includes at least one processor 914 which communicates with a number of peripheral devices via bus subsystem 912. These peripheral devices may include a storage subsystem 924, including, for example, a memory subsystem 928 and a file storage subsystem 926, user interface input devices 922, user interface output devices 920, and a network interface subsystem 916. The input and output devices allow user interaction with the control electronics 900. Interface subsystem 916 provides an interface to outside devices and networks and is coupled to corresponding interface devices in other computer or electronic systems such as, for example, conventional computers, digital signal processors, and/or other computing devices. For example, in one embodiment, interface subsystem 916 supports interfacing of the control electronics 440 to the cryptographic device 410, the wire feeding device 420, and the power electronics 430 in FIG. 4.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the control electronics 900 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the control electronics 900 to the user or to another machine or computer system.

Storage subsystem 924 stores programming and data constructs that provide or support some or all of the functionality described herein (e.g., as software modules). For example, the storage subsystem 924 may include various programmable welding mode constructs for controlling the power electronics 430 and the wire feeding device 420.

Software modules are generally executed by processor 914 alone or in combination with other processors. Memory 928 used in the storage subsystem can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 926 in the storage subsystem 924, or in other machines accessible by the processor(s) 914.

Bus subsystem 912 provides a mechanism for letting the various components and subsystems of the control electronics 900 communicate with each other as intended. Although bus subsystem 912 is shown schematically as a single bus, alternative embodiments of the bus subsystem may use multiple buses.

The control electronics 900 can be configured as any of various types including a microprocessor and other components on a printed circuit board (PCB), a workstation, a server, a computing cluster, a blade server, a server farm, or any other data processing system or computing device. Due to the ever-changing nature of computing devices and networks, the description of the control electronics 900 depicted in FIG. 9 is intended only as a specific example for purposes of illustrating some embodiments. Many other configurations of the control electronics 900 are possible having more or fewer components than the control electronics depicted in FIG. 9.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. A welding system, the welding system comprising:
a welding power source configured to provide electrical power for a welding process; and
a welding torch having a cryptographic device, the welding torch configured to be used with the welding power source during the welding process and communicate with the welding power source,
wherein the cryptographic device is configured to:
receive an encryption key seeded by the welding power source during first time power-on initialization of the welding power source with the welding torch, or after the welding torch is replaced on the welding power source,
store an unlock code associated with the welding power source,
generate an encrypted message, which includes the unlock code, based on the encryption key as seeded, and
communicate the encrypted message to the welding power source, and
wherein the welding power source is configured to cease further operation unless the welding power source determines the welding torch to be a genuine manufacturer welding torch based on the unlock code, and
wherein a polynomial spline is applied to the unlock code to change the unlock code as part of generating updated encryption messages.

2. The welding system of claim 1, wherein the cryptographic device is configured to periodically generate and communicate the updated encryption messages to the welding power source to guarantee a continuing presence of the welding torch as a genuine manufacturer welding torch.

3. The welding system of claim 1, wherein the cryptographic device is fuse protected.

4. The welding system of claim 1, wherein communication between the welding torch and the welding power source is a wired communication.

5. The welding system of claim 1, wherein communication between the welding torch and the welding power source is a wireless communication.

6. The welding system of claim 1, wherein the welding torch includes a body and the cryptographic device resides within or on the body of the welding torch.

7. The welding system of claim 1, wherein the welding torch includes a torch lead and the cryptographic device resides within or on the torch lead of the welding torch.

8. The welding system of claim 1, wherein the cryptographic device includes a printed circuit board with electronic components mounted on the printed circuit board.

9. The welding system of claim 1, wherein the welding power source includes a wire feeding device, power electronics, and control electronics.

10. The welding system of claim 1, wherein the encrypted message further includes at least one of a part number of the welding torch and a serial number of the welding torch.

11. A cutting system, the cutting system comprising:
a cutting power source configured to provide electrical power for a cutting process; and
a plasma cutting torch having a cryptographic device, the plasma cutting torch configured to be used with the cutting power source during the cutting process and communicate with the cutting power source,
wherein the cryptographic device is configured to:
receive an encryption key seeded by the cutting power source during first time power-on initialization of the cutting power source with the plasma cutting torch, or after the plasma cutting torch is replaced on the cutting power source,
store an unlock code associated with the cutting power source, generate an encrypted message, which includes the unlock code, based on the encryption key as seeded, and communicate the encrypted message to the cutting power source, and wherein the cutting power source is configured to cease further operation unless the cutting power source determines the plasma cutting torch to be a genuine manufacturer plasma cutting torch based on the unlock code, and wherein a polynomial spline is applied to the unlock code to change the unlock code as part of generating updated encryption messages.

12. The cutting system of claim 11, wherein the cryptographic device is configured to periodically generate and communicate the updated encryption messages to the cutting power source to guarantee a continuing presence of the plasma cutting torch as a genuine manufacturer plasma cutting torch.

13. The cutting system of claim 11, wherein the cryptographic device is fuse protected.

14. The cutting system of claim 11, wherein communication between the plasma cutting torch and the cutting power source is a wired communication.

15. The cutting system of claim 11, wherein communication between the plasma cutting torch and the cutting power source is a wireless communication.

16. The cutting system of claim 11, wherein the plasma cutting torch includes a body and the cryptographic device resides within or on the body of the plasma cutting torch.

17. The cutting system of claim 11, wherein the plasma cutting torch includes a torch lead and the cryptographic device resides within or on the torch lead of the plasma cutting torch.

18. The cutting system of claim 11, wherein the cryptographic device includes a printed circuit board with electronic components mounted on the printed circuit board.

19. The cutting system of claim 11, wherein the cutting power source includes power electronics and control electronics.

20. The cutting system of claim 11, wherein the encrypted message further includes at least one of a part number of the plasma cutting torch and a serial number of the plasma cutting torch.

21. A welding torch configured to present as a genuine manufacturer part to a welding power source, the welding torch comprising:

a cryptographic device to be used with a welding power source during a welding process and communicate with the welding power source, wherein the cryptographic device is configured to:

receive an encryption key seeded from the welding power source during first time power-on initialization of the welding power source with the welding torch, or after the welding torch is replaced on the welding power source, store an unlock code associated with the welding power source, generate an encrypted message, which includes the unlock code, based on the encryption key as seeded, and communicate the encrypted message to the welding power source, and wherein the unlock code of the encrypted message, as communicated to the welding power source, is configured to allow the welding power source to determine that the welding torch is a genuine manufacturer welding torch, and wherein a polynomial spline is applied to the unlock code to change the unlock code as part of generating updated encryption messages.

* * * * *